(12) United States Patent
Clark (10) Patent No.: US 10,003,204 B2
(45) Date of Patent: Jun. 19, 2018

(54) PORTABLE MULTIPLE MOBILE ELECTRONIC DEVICE CHARGING STATION

(71) Applicant: Kenneth E. Clark, Celebration, FL (US)

(72) Inventor: Kenneth E. Clark, Celebration, FL (US)

( * ) Notice: Subject to any disclaimer, the term of this patent is extended or adjusted under 35 U.S.C. 154(b) by 12 days.

(21) Appl. No.: 15/363,124

(22) Filed: Nov. 29, 2016

(65) Prior Publication Data

US 2017/0077724 A1  Mar. 16, 2017

Related U.S. Application Data

(63) Continuation-in-part of application No. 13/998,785, filed on Dec. 9, 2013, now Pat. No. 9,509,153.

(51) Int. Cl.
*H02J 7/00* (2006.01)

(52) U.S. Cl.
CPC .......... *H02J 7/0027* (2013.01); *H02J 7/0014* (2013.01); *H02J 7/0042* (2013.01); *H02J 7/0045* (2013.01); *H02J 7/0054* (2013.01); *H02J 7/0055* (2013.01)

(58) Field of Classification Search
CPC ....... Y02E 60/12; H02J 7/0054; H02J 7/1423; H01M 10/44; H01M 10/46

USPC .......................................................... 320/103
See application file for complete search history.

(56) References Cited

U.S. PATENT DOCUMENTS

| | | | |
|---|---|---|---|
| 6,337,558 B1 * | 1/2002 | Yuen ..................... | H02J 7/0045 320/107 |
| 2013/0320913 A1 * | 12/2013 | Chen ..................... | H02J 7/0042 320/103 |

\* cited by examiner

*Primary Examiner* — Arun Williams (57) ABSTRACT

Compact and portable station for charging multiple mobile devices is described, embodiments of the station include: a rectangular housing comprising one or more removable battery packs comprising rechargeable battery cells, a divider plate, a main charging board configured as a charge and cell balancing circuit board, and a plurality of cord cartridges housing retractable cords, and a faceplate (interface) configured with interface ports, configured to enable charging of up to eight (8) connected electronic devices from the battery packs simultaneously. In another embodiment, the charging station further comprises a front panel display configured to display operating status information, such as battery charge level and power status. The unit is intended for use in public places for customer convenience and offering businesses advertising space.

13 Claims, 10 Drawing Sheets

PORTABLE MULTIPLE MOBILE ELECTRONIC DEVICE CHARGING STATION

CROSS-REFERENCE TO RELATED APPLICATIONS

This application is a continuation-in-part of earlier filed U.S. application Ser. No. 13/998,785, filed on Dec. 9, 2013, the contents of which are hereby incorporated by reference in its entirety.

BACKGROUND TO THE INVENTION

Current mobile phones use more battery power for all of the applications and the battery life of the phone is depleted rapidly causing the need to recharge the device more often. Typically a person does not carry a charging device with them and if so they do not have access to a power outlet. The present invention for charging mobile phones in public places will offer a much needed convenience. The advertising space offers businesses an incentive to offer the convenience.

SUMMARY OF THE INVENTION

The present invention relates to a portable multiple mobile electronic device charging station (also referred to herein, for simplicity, as "charging station") for charging up to eight mobile devices in public places, where the charging station may also provide space for advertising. The invention provides a charging station, which is a rechargeable unit for charging mobile electronic devices.

In a first aspect the invention provides a charging station for multiple mobile electronic devices comprising a housing with a lid. The housing contains a rechargeable ion battery, or alternatively a rechargeable battery pack, a divider plate, a main charging board, and a cord housing, or alternatively a plurality of cord housing cartridges. The cord housing houses up to eight retractable cords, and a faceplate with up to eight interface ports, which are configured to enable charging of connected electronic devices from the battery simultaneously. Cord cartridges comprise retractable charging cords adapted for connection to one or both of a main charging board and a mobile electronic device.

In another aspect, a portable multiple mobile electronic device charging station comprises a housing; one or more removable battery packs comprising rechargeable battery cells; a divider plate; a main charging board connected to the one or more battery packs, wherein the charging board is configured as a charge and cell balancing circuit board and is connected to a plurality of cord cartridges housing retractable charging cords adapted at one end for connection to a mobile device; and a faceplate (interface) configured with interface ports, wherein the charging station enables charging of one or more connected mobile electronic devices simultaneously. In one embodiment, the charging station further comprises a display configured to display, such as on the front or side panel of the charging station, operating status information, such as battery charge level and/or power status.

The portable multiple mobile electronic device charging station is capable of providing a full charge for up to eight mobile devices simultaneously, or individually providing convenient mobile charging in public places. For example, the charging station may provide a full charge for up to 2, 3, 4, 6, 7 or 8 mobile devices. Suitable mobile devices include mobile phones and tablet devices, although in principle any device using a similar charging interface may be charged using a charging station of the invention.

The housing may be approximately cuboid, e.g. a rectangular cuboid or cube shaped. In one illustrative embodiment, the housing may have a length of 13-16 cm (e.g. 14.7 cm), height of 11-13 cm (e.g. 12.4 cm) and width of 10-12 cm (e.g. 11 cm), although alternate dimensions are possible—such as a more compact design or a larger design, with the prerequisite design being that the housing is generally rectangular and the overall size permits portability. The lid may be a flip lid. The lid may be located on the top face of the housing. The battery of the portable charging station may be a 12-volt battery, e.g. a 12-volt lithium ion battery, or one or more rechargeable battery packs. The up to eight interface ports (e.g. 2, 3, 4, 5, 6, 7 or 8 interface ports) may be configured to enable charging of the connected electronic devices from the battery simultaneously at up to 5 VDC per device. The cord housing may comprise eight retractable cords and a faceplate with eight interface ports. The cord housing may comprise less than 8, e.g. 2, 3, 4, 5, 6 or 7 retractable cords and/or interface ports. In another embodiment, a cord housing cartridge comprises a retractable charging cord configured for connection with one or both of the main charging board and a mobile electronic device. Multiple interface ports are provided to supply power to multiple and different devices, simultaneously.

The cord housing may be an enclosed casing for holding eight interface ports and eight retractable cords comprising: eight interface ports wherein up to eight mobile devices can be connected and charged simultaneously; and up to eight spools of cords used for charging mobile devices extendable up to two or four feet, wherein each spool of cord can be independently replaced.

In another embodiment, the cord housing comprises a cord cartridge comprising a spool of charging cord for use charging mobile devices, the cord retractable up to four feet, wherein the charging cord is configured with connector ends for connecting to one or both of a mobile device and a main charging board. The cord spool may be a mechanism for retracting cords used for charging mobile devices comprising a single-sided spool, wherein a mobile device charging cord is extendable up to two feet, or up to four feet, from the spool and is retractable. In one embodiment, the cord cartridge is a cord housing generally rectangular in shape, In one embodiment, charging station and its main components may be made of rigid, semi-rigid materials or flexible materials, such as plastics, resins, rubber, or other natural or synthetic materials commonly used in consumer electronics products. In one embodiment, the charging station comprises one or more seals, or combination of seal materials, in order to provide a waterproof container when the lid is closed.

The portable charging station may further comprise at least one advertising message placed as a wrap and/or silk screening on the exterior of the charging station, such as affixed (permanently or reversibly) to a portion of the housing. The charging station can be covered with wraps or silk screening for advertising. The use of advertising may provide an incentive for a business to sponsor charging station.

The charging station comprises a housing, a battery located within the housing, a main charging board located within the housing and up to eight interface ports, or alternatively, charge cartridges, in communication (connected to for transfer of power) with the main charging board. The battery may be a 12-volt battery, for example a 12-volt lithium ion battery. The battery may have a capacity of 10000-30000 mAh, e.g. a capacity of about 20000 mAh. The battery may have an input of about 5 V/2 A and/or an output of 5 V/4 A. The battery may be capable of charging up to six or up to eight mobile devices simultaneously. The device may comprise or consist of 2, 3, 4, 5, 6, 7 or 8 interface ports. The charging station is configured to enable charging of multiple mobile devices from the charging station simultaneously.

The interface ports may comprise a cord housing that comprises up to eight (for example the cord housing may comprise or consist of: 2, 3, 4, 5, 6, 7 or 8; e.g. 6, 7 or 8) retractable cords to connect mobile devices for charging. The retractable cords may have a maximum extended length of up to about 1 ft., 2 ft., 3 ft. or 4 ft., e.g. the retractable cords may have a maximum extended length of up to about 2 ft., or 3 ft. or more. In one embodiment, each retractable cord may be in an independent module comprising a charge cord cartridge, mounted to the main charging board in the cord housing. Each independent cartridge module may be independently interchangeable, which may permit the device to be updated with new retractable cord(s) when new mobile devices with different charging sockets (connector ends) become available. In another embodiment, the charging station is configured to rest on a charging base, which charges the rechargeable battery contained within the charging station.

In a second aspect the invention provides a separate charging base for use with a portable charging station of the invention. The charging base comprises a battery connector adapted such that a portable multiple mobile device charging station may be placed upon it; an input adapter configured to connect an input voltage; and an output adaptor. The charging base is configured such that the input voltage provides a voltage source for the battery connector and the output adaptor. The input voltage is provided by an AC-DC inverter cord or the output adaptor of another charging base.

In one embodiment, the charging base comprises an input and an output adaptor. One of the input adaptor and output adaptor may be male. The other of the input and output adaptor may be female. For example, the input adaptor may be female and the output adaptor may be male. The input adaptor provides an input for an input voltage that provides a voltage source to charge the rechargeable battery. The output adaptor provides an output for a voltage at the same or a similar level to the input voltage. The input voltage may be provided by an AC-DC inverter cord that converts an AC source to $12V_{DC}$, for example a $120V_{AC}$ to $12V_{DC}$ inverter cord or a $230V_{AC}$ to $12V_{DC}$ inverter cord. The input voltage may be provided by the output adaptor of another charging base of a device of the invention.

This provides a compact arrangement for providing power to multiple, e.g. up to six, charging bases. For example an AC-DC inverter cord may be used to provide power (e.g. $12V_{DC}$) to a first charging base, with the output adaptor of the first charging base providing a voltage source for the input adaptor of the second charging base. The output adaptor of the second charging base may be connected to the input adaptor of a third charging base. Up to six charging bases of the present invention, for example 2, 3, 4, 5 or 6 charging bases may be connected in series in this manner, using a single external voltage input into the first charging base. This provides that the charging devices of the invention may be connected in a modular manner, providing scalability.

In a third aspect the invention provides a device that comprises a portable charging station of the first aspect placed on a charging base of the second aspect, wherein the portable charging station is placed on the portable charging base such that the rechargeable battery is in electrical connection with the battery connector. This device may comprise up to six portable charging stations placed on up to six charging bases connected in series.

In an aspect the invention provides a method of charging a mobile electronic device, comprising connecting the mobile electronic device to a retractable charging cord of the portable charging station of the device as described, and as embodied by the figures.

DETAILED DESCRIPTION OF THE INVENTION

Figure 1:
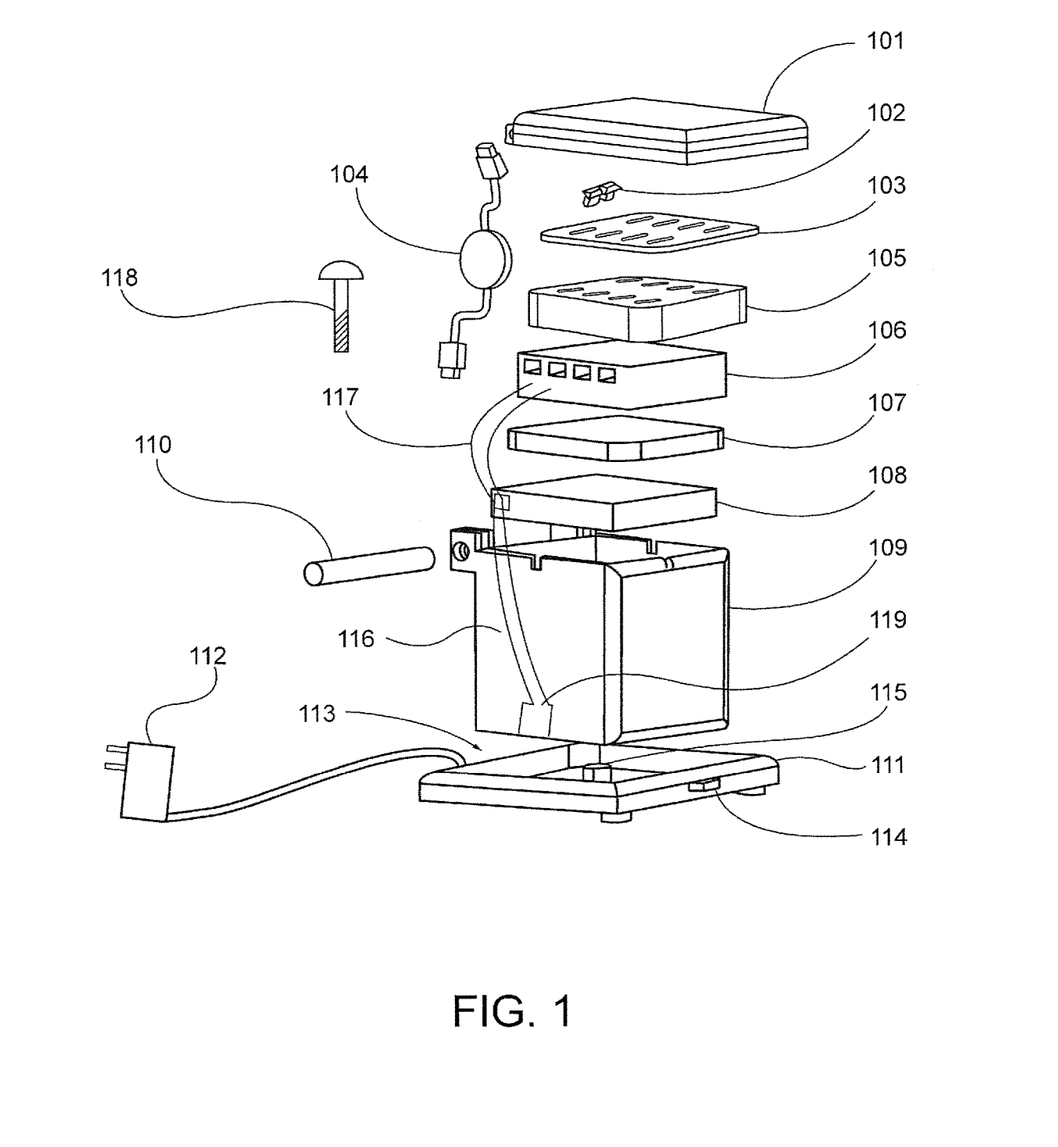
FIG. 1 shows an exploded view diagram showing an embodiment of the present invention.

FIG. 1 represents a portable multiple mobile electronic device charging station that is an embodiment of the present invention. The portable multiple mobile electronic device charging station is intended to charge mobile devices in public places while providing advertisement space. The portable multiple mobile electronic device charging station typically uses a charging base 111 to charge the rechargeable battery 108 (for example a 12-volt lithium ion battery) that is mounted in housing 109, that is covered by divider 107 that charging board 106 is mounted to covered by a cord housing 105, that retractable cord 104 mounts inside of and that plugs into main charging board 106, the opposite end of retractable cord 104 goes through faceplate 103 and held in place by a retainer 102 (for example a plastic filler) that snaps into faceplate 103 to prevent over retracting. The housing 109 is covered by lid 101. The housing 109 and lid 101 are mounted together by a hinged arrangement which may comprise a connector pin 110. A wiring harness 116 connects a female receiver 119 to the rechargeable battery 108, connecting wire 117 connects the rechargeable battery 108 to main charging board 106 and electrical cord 112 (not illustrated) inserts into input connector 113 making it capable to plug into a wall outlet. An output connector 114 is available to insert into an additional stations to interlock them and transfer power through multiple units with one power supply. Screws 118 (not illustrated) will pass through parts, faceplate 103, cord housing 105, divider plate 107, and screws into main housing 109, female receiver 119 connects to charging mount 115.

Figure 2:
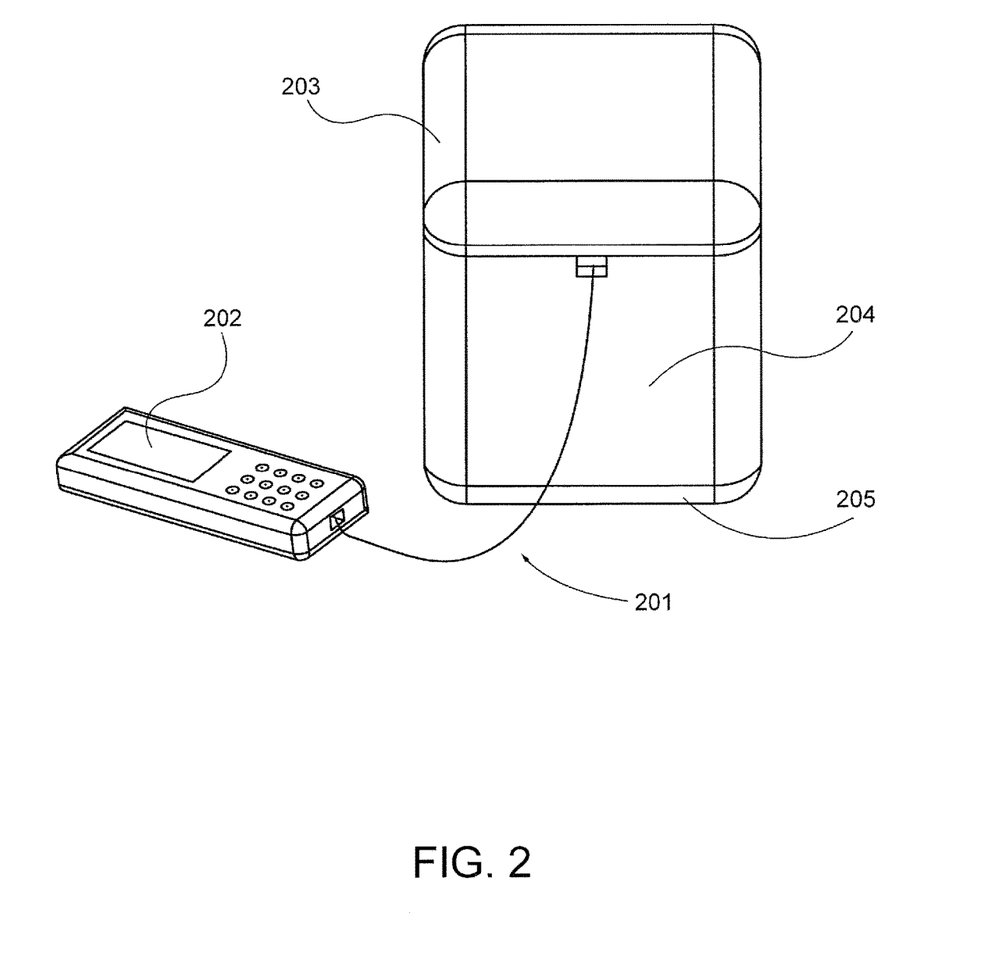
FIG. 2 shows a front view diagram showing an embodiment of the present invention in use.

FIG. 2 shows an embodiment of the present invention in use. The invention typically uses retractable cord 104 that mounts inside of the cord housing 105 and that plugs into main charging board 106, with one end that plugs into main charging board 106 and the opposite end of retractable cord 104 goes through faceplate 103, as explained in relation to FIG. 1. The end of the retractable cord that goes through the faceplate 103 further goes through a slot 201 from main housing 109 that is covered by lid 101. The retractable cord ends in a head that may plug into electronic device 220. The charging station may also display an advertisement on advertising space 230. The advertising space 230 may be located on the outside of the housing 109 and/or the advertising space may be located on the lid 101.

Figure 3:
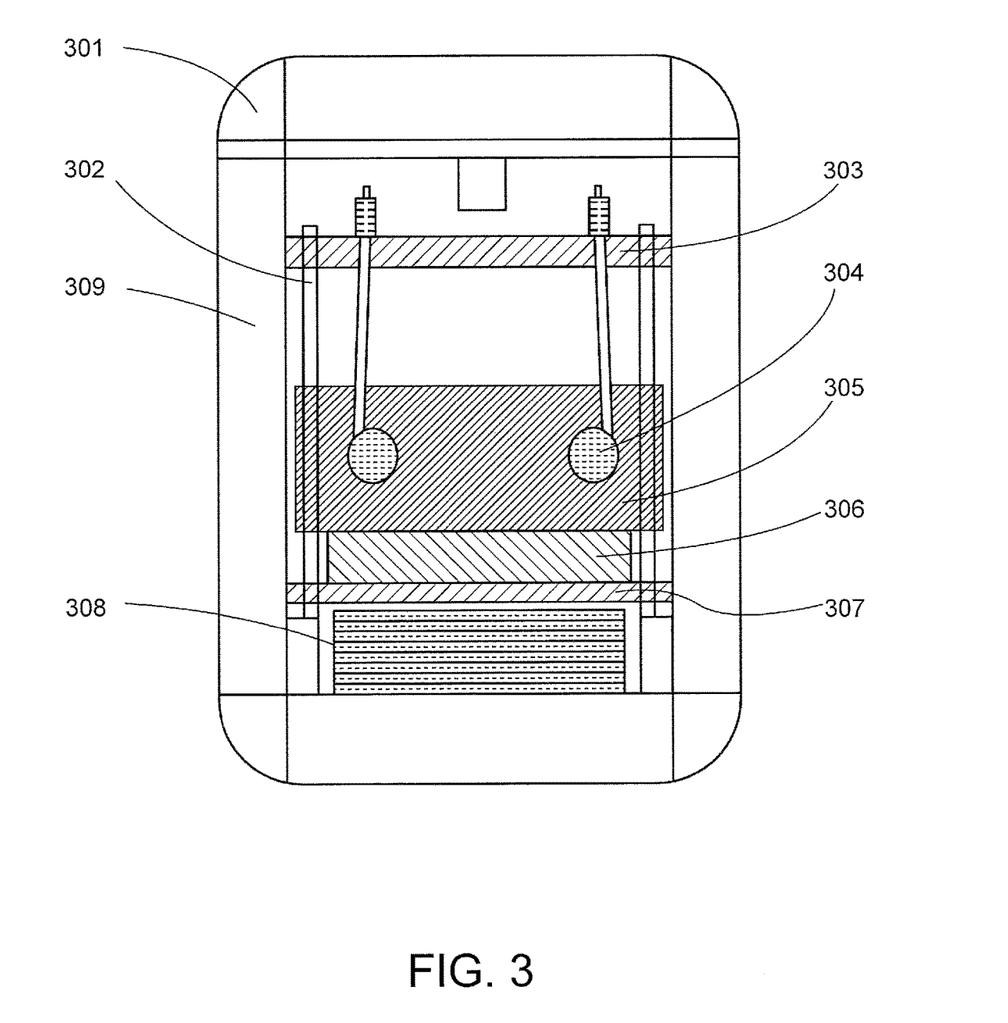
FIG. 3 shows a cross section view diagram showing the internal layout of an embodiment of the present invention.

FIG. 3 shows a cross section of a charging station of FIG. 2 ready for use, typically containing faceplate 103 that retractable cord 104 protrudes through that is mounted in cord housing 105 that sits on main charging board 106 that mounts onto divider plate 107 that covers a rechargeable battery 108 (e.g. a 12-volt lithium ion battery) which is secured in place by screws 118 going through faceplate 103, cord housing 105, divider plate 107 and mounts to main housing 109 which is contained under lid 101.

Figure 4:
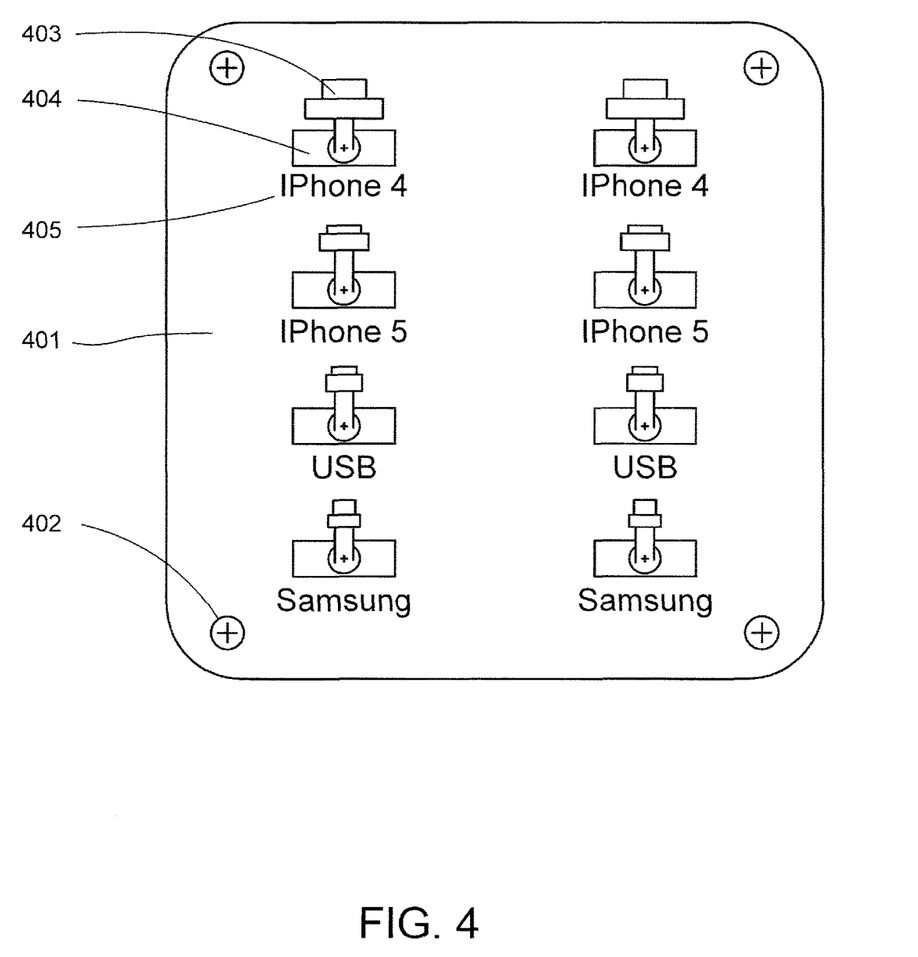
FIG. 4 shows a top view of an embodiment of the present invention without lid showing details.

FIG. 4 shows detail of the top of an exemplary charging station containing faceplate 403 attached to station by screws 418 with retractable cord 404 protruding through and secured by plastic filler 402 with cord label 405 identifying the different cord options. Each retractable cord 404 may be independently removed and inserted from the cord housing. Advantageously, this allows the configuration of the cord options to be updated as necessary. For example if a new mobile devices becomes available that does not correspond to an existing cord option of a charging station of the invention, an obsolete retractable cord 404 may be removed from the cord housing 105 and replaced with a new retractable cord 404 that is compatible with the new device. Similarly, a damaged retractable cord 404 may be readily replaced with a new retractable cord 404.

Figure 5:
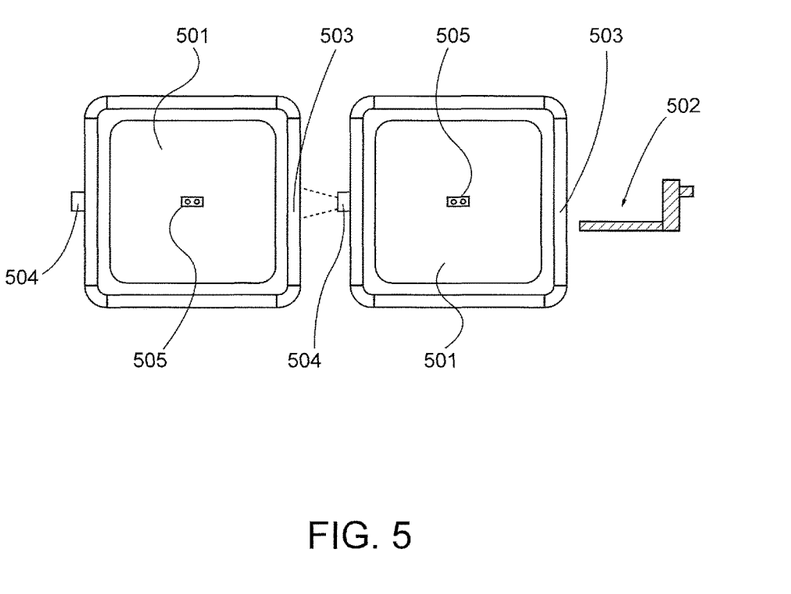
FIG. 5 shows a front view diagram showing the interlocking bases of an embodiment of the present invention.

FIG. 5 shows the details of a charging base with a front view diagram showing the interlocking of bases of an embodiment of the present invention. This typically contains a charging base 511 which connects to a power outlet by the electrical cord 512 supplying power into the input connector 513 for a charging station to be placed on battery connector or charging mount 515. If multiple bases are connected, power is supplied to the next charging base 502, for example, by output connector 514 inserted into the next input connector 503.

In one embodiment, a wiring harness connects a female receiver to the rechargeable battery, connecting wire connects the rechargeable battery to main charging board and electrical cord inserts into input connector making it capable to plug into a wall outlet. An output connector is available to insert into additional stations to interlock them and transfer power through multiple units with one power supply. Screws will pass through parts, faceplate, cord housing, divider plate, and screws into main housing, female receiver connects to charging mount.

In another embodiment a portable charging station for multiple mobile electronic devices comprises a housing comprising one or more removable battery packs comprising rechargeable battery cells, a divider plate, a charging board configured as a charge and cell balancing circuit board, and a plurality of cord cartridges housing retractable cords, a display configured to display battery charge level; and a faceplate (interface) configured with interface ports disposed along the interface residing on the top surface of the housing, configured to enable charging of connected electronic devices from the battery packs simultaneously.

In one embodiment, the charging station is configured with dual slots, or openings, for removable battery packs. In another embodiment, the charge rate verification for each charging cartridge comprising a 750 mA charge rate. In one embodiment, an overall capacity ranges from 10000 to 30000 mAh capacity, such as 20000 mAh. The rechargeable battery packs may have an input, collectively or individually, of 5V/2 A, and an output of 5V/4 A and enable charging of a plurality of mobile device simultaneously.

In one embodiment, to a top surface of charging board are mounted solid state devices and connectors comprising power discretes and/or passives comprising a voltage regulation circuit. In one embodiment, connectors are configured for the connection to rechargeable battery packs, in another embodiment, the connectors are configured for connection to a standard AC plug adapter, to allow charging of devices in the absence of batteries or if batteries are depleted of charge as a back-up. In one embodiment, charging board is configured for connection with charging cartridges via a USB connection between the USB connector end of the cartridge and the USB port of charging board. In another embodiment, charging board is also configured for connection to USB ports aligned with interface plate. In another embodiment, a control mechanism controls the selection of power to the device from a particular battery pack, such as a primary battery pack or secondary (reserve batter pack), to better manage capacity.

In one embodiment, the plurality of charge cartridges comprise 2, 3, 4, 5, 6, 7 or 8 charge cartridges. In one embodiment, charge cartridges are configured to plug into USB ports of charging board by connection between the USB connector ends of charging cable with corresponding USB ports of charging board.

Figure 6:
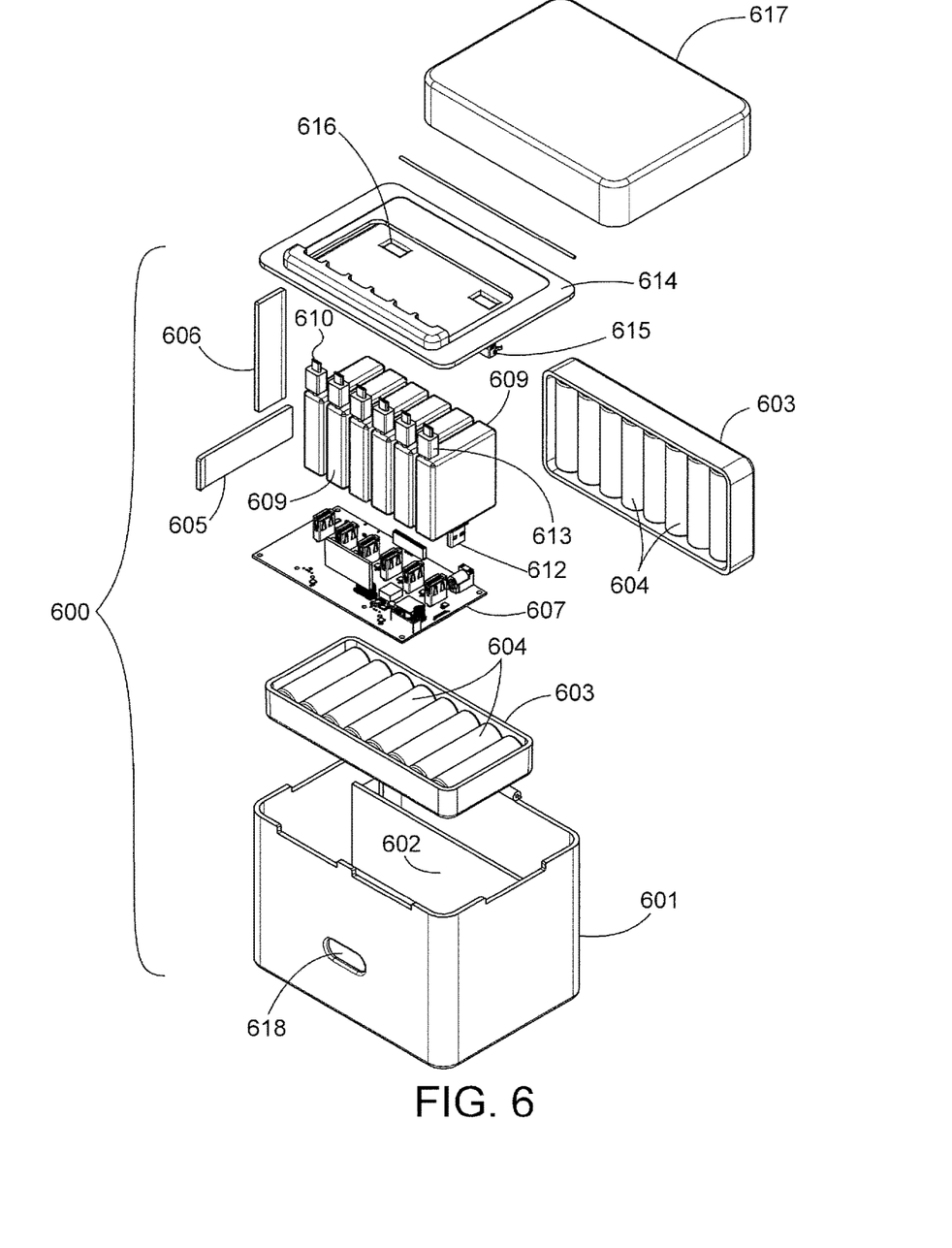
FIG. 6 shows an exploded view diagram showing a charging station according to one embodiment of the present invention.

FIG. 6 represents a portable multiple mobile electronic device charging station 600 according to one embodiment of the invention. The portable multiple mobile electronic device charging station 600 is intended to charge mobile devices simultaneously, or individually. In one embodiment, portable charging station 600 comprises a rectangular-shaped housing 601 comprising four sides, a bottom side, and an interior cavity. One or more sides housing 601 may include a recessed edge along the upper rim of a side in order to provide an opening, or cord port, 619 for charge cords to pass from the interior of housing to the exterior of the charging station. Housing 601 is configured with one or more of an internal divider plate 602 that bisects the inner chamber of the housing 601; one or more removable rechargeable battery packs 603 comprising a plurality of rechargeable battery cells 604; a first access panel 605; a second access panel 606 oriented perpendicular to the horizontal access panel 605, the access panels of dimensions commensurate with the battery packs in order to permit movement of the battery packs in and out of the housing 601 through the access panels and are located along one or more sides of charging station housing or bottom side of charging station housing; a charging board 607 configured as a charge and cell balancing circuit board configured with a plurality of USB ports and device connectors; a plurality of cord cartridges 609 each configured with a retractable charging cord comprising a device connector end 610 protruding from a top face of the cord cartridge 609 and a USB connector end 612 protruding from a bottom face of the cord cartridge 609, and wherein the cartridge 609 houses a retractable charging cord wound around a retractable spool member arranged within the cord cartridge 609; a faceplate (interface) 614 configured with a plurality of openings through which the device connector ends 610 traverse, held in place by retainers 613 that reside on the upper surface of the faceplate when the charging station is fully assembled, the faceplate 614 also configured with openings 616 for one or more USB ports 615, the USB ports disposed beneath the surface of faceplate 614; display indicator 618 configured to display a battery charge level; and a flip lid 617 that covers upper face of housing 601, providing a protective covering of the device connectors 610.

Figure 7:
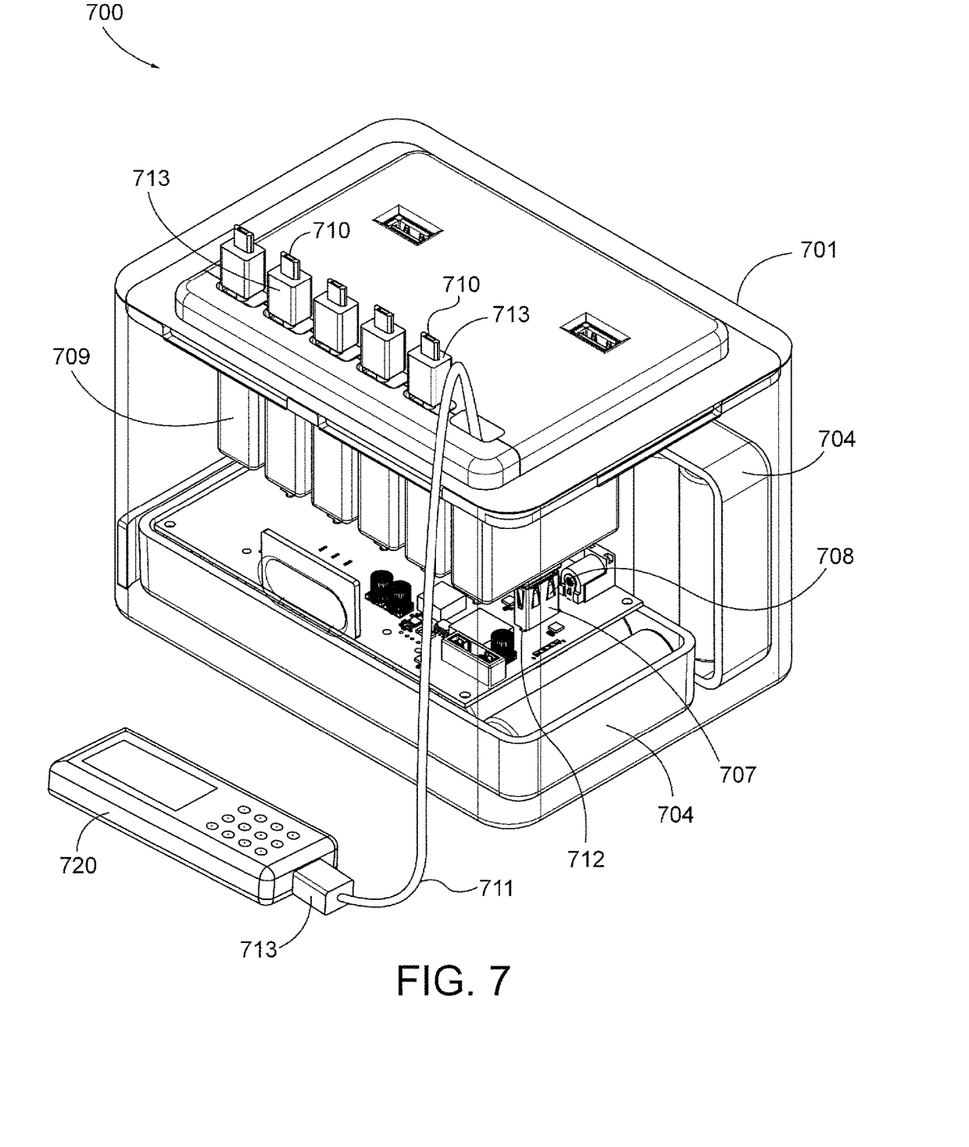
FIG. 7 shows a front side view showing an embodiment of the present invention (absent lid) in use with a portable electronic device.

FIG. 7 shows a front side view of charging station 700, represented as transparent in order to show an internal view of the arrangement of battery packs 704, charging board 707, charging cartridges 709 are shown aligned vertically within housing 701 of charging station 700. Visible is a USB connector end 712 of charging cartridge 709 connected to USB port 708 of charging board 707. Device end 710 of retractable charging cord is shown on the outer side of faceplate 712, with the retractable charging cord 711 held in position and kept from retracting into the cartridge by retainer 713, shown in the figures as a cube shaped attachment that is of a greater size that the opening of the cartridge, in order to prevent the cord from retracting inward into the cartridge interior. In one embodiment, a charging cord is used to charge a mobile device 720 by engaging device end 710 of charging cord with the receiving end (such as a port for a lighting adapter, for example) of device 720. While a mobile phone is shown attached to charging station in the figure, it should be understood that many types of devices may be connected for charging, provided that the corresponding device connector end is adapted to the charging station. Examples of device include, but are not limited to, iphones, android phones, tablets, ipads, blackberries, laptop computers, wearable devices, and other similar devices as they may be designed.

Figure 8:
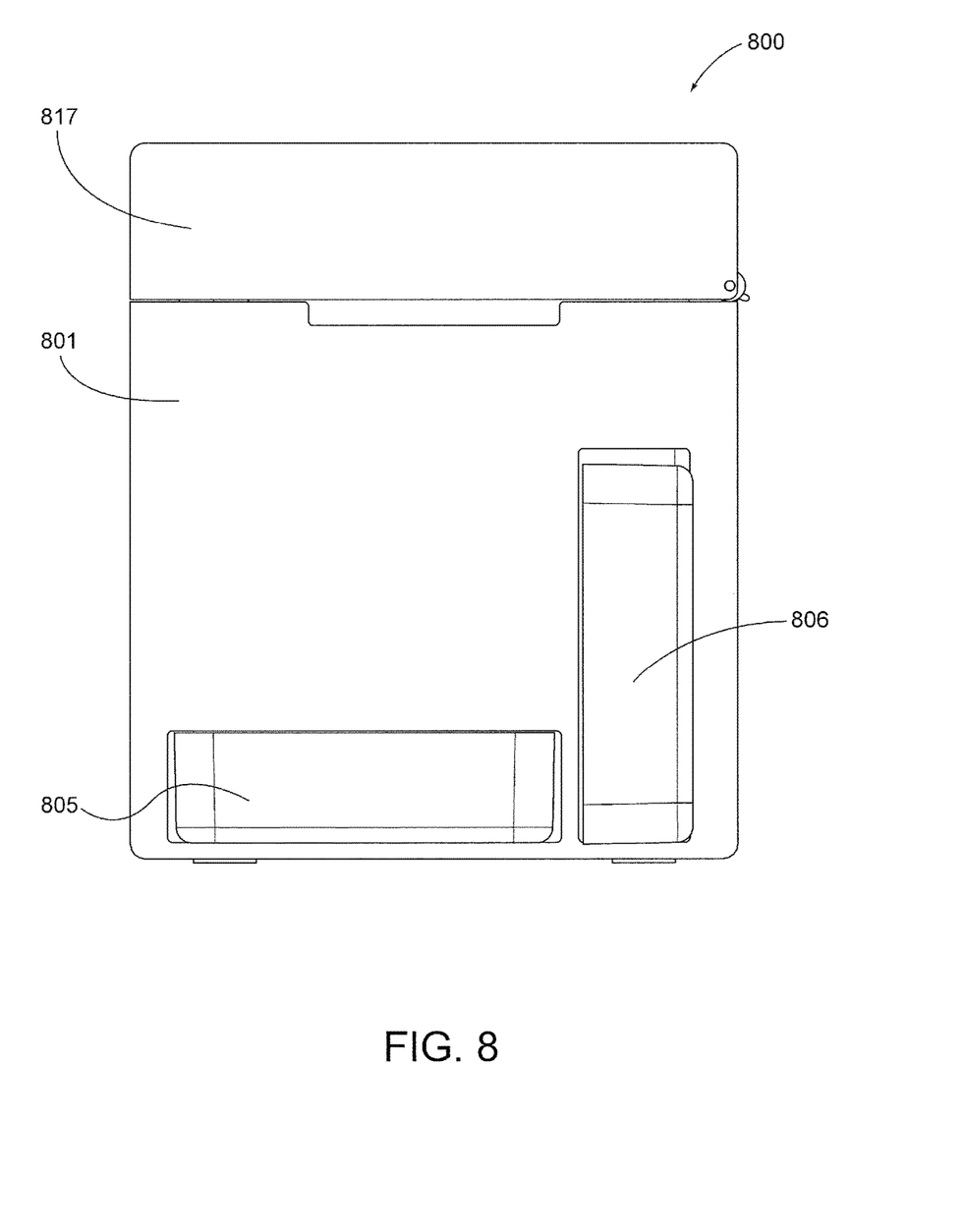
FIG. 8 shows a side view of the charging station according to one embodiment of the present invention.

FIG. 8 shows a side view of a charging station 800 according to one embodiment of the present invention. In one embodiment, battery packs are removable from housing 801 via access panels 805 and 806. Battery packs may align within the housing 801 in various orientations. For example, while FIG. 8 shows the battery packs as being aligned vertically and horizontally in the housing, other arrangements are envisioned. Furthermore, a single battery pack may be used, or multiples. In another embodiment, one or more connecting wires connects the rechargeable battery to the charging board. Also shown are housing 801 and lid 817 mounted together ("closed" position of the charging station) by a hinged arrangement, which may comprise a connector pin or other mechanism, such as a magnetic or snap closure.

Figure 9:
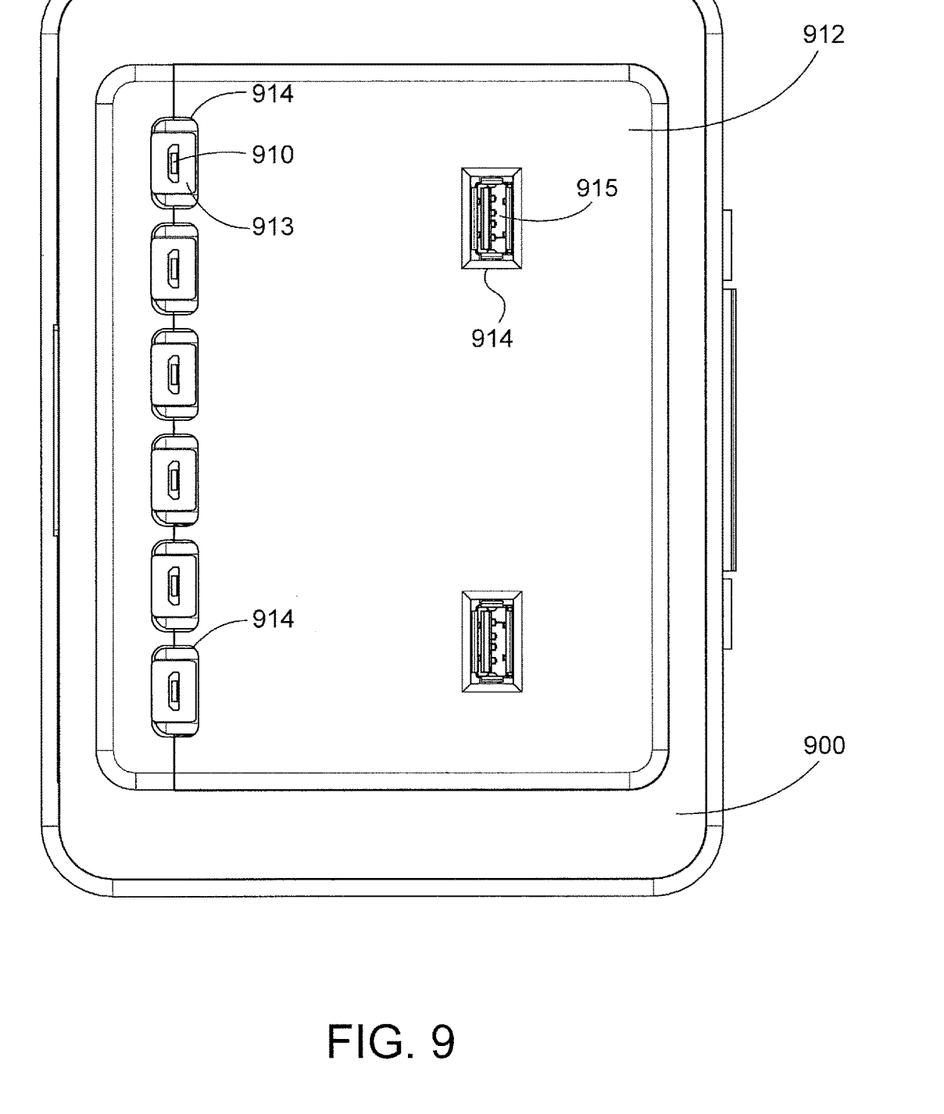
FIG. 9 shows a top view of an embodiment of the present invention, absent lid, to show the arrangement of charging ports on the upper surface of charging station.

FIG. 9 shows detail of faceplate (interface) 912, configured with openings that expose device end 910 of one or more charging cables disposed on upper surface of charging station 900. In one arrangement, device connecting end 910 protrudes through opening 914 in faceplate 912, and is held in position by retainer 913. Face plate 912 may also be configured with one or more USB ports 915. While the arrangement of FIG. 9 shows six (6) device ends and two USB ports arranged in linear fashion along faceplate 912, it will be understood that this is one possible arrangement (and number of connectors) of many possible arrangements. The arrangement shown here is illustrative and not intended to be exhaustive. In another embodiment, device connecting end 910 of charging cord are shown in the figure as adapted for an iPhone, although this feature is not limiting. In one embodiment, device ends 910 comprise ends adapted to fit one or more devices, such as iPhone, or android devices—or a combination thereof, and may also accommodate adapters as they evolve for various portable electronic devices.

Figure 10:
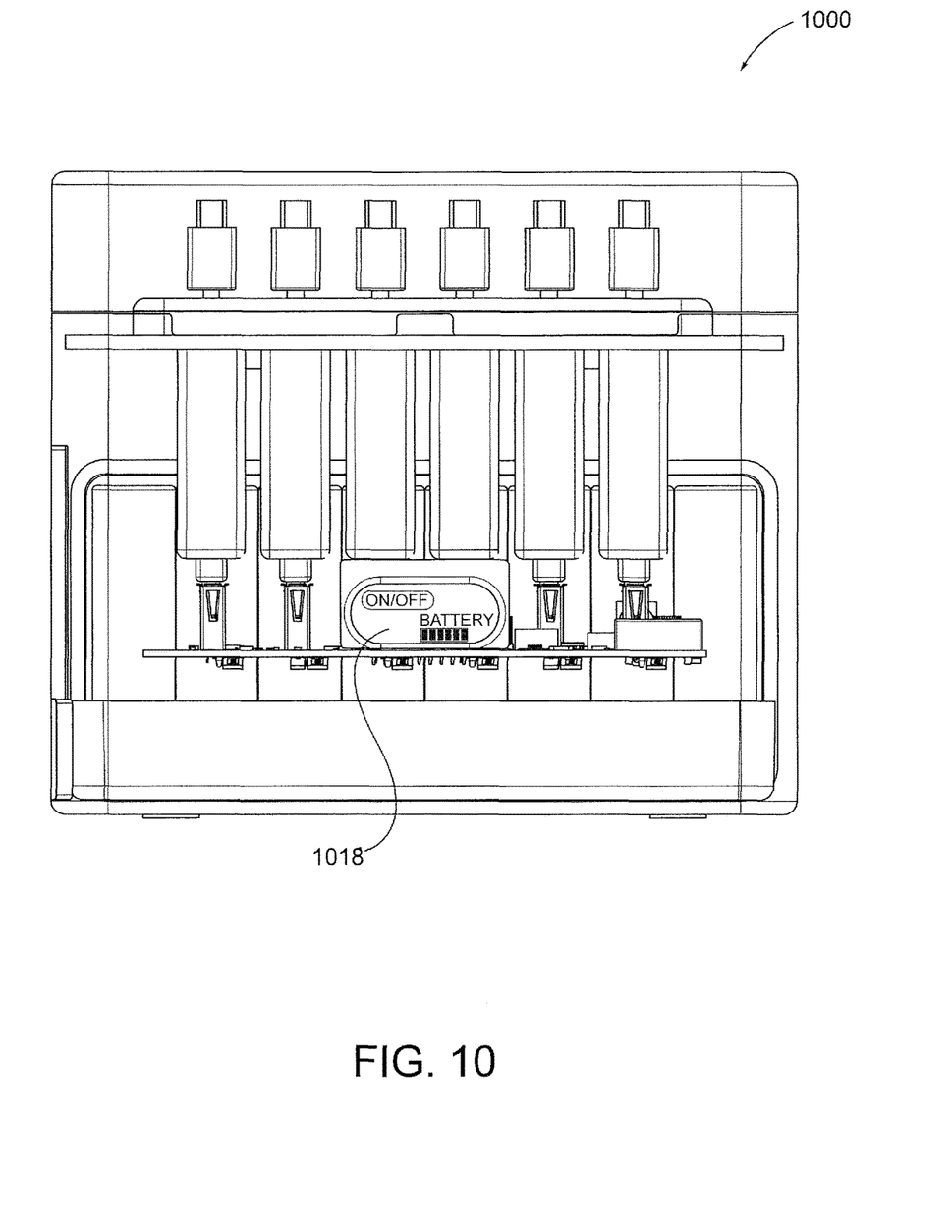
FIG. 10 shows a front view of the charging station according to one embodiment of the present invention.

FIG. 10 shows a front view of charging station 1000 according to one embodiment of the invention, comprising a display 1018 comprising an LED or other display screen configured to display a power status and/or a battery charge level. In another embodiment, the display is configured with a power mode configured with an inactive mode or an active mode. In yet another embodiment, the display comprises a touch screen comprising means for initiating a device "on/off" state. In one embodiment, display connects to charging board, either by direct connection or by a wired connection.

In another embodiment, the charging station is configured for remote operation, such as a power on and power off feature via wireless communication between a remote control and the charging station, for turning the unit from an inactive state to an active state, and vice versa, in order to conserve battery power. In yet another embodiment, the charging station is configured with a stand-by mode.

In one embodiment, the charging station is configured with a power source comprising a primary battery pack and a secondary (reserve battery) pack. When a state of low power is detected to charge devices, or power drops below a minimum threshold for the charging station, a control mechanism associated with the power source then controls the engagement of the reserve battery pack, and the charge board circuit is switched, so that instead of drawing power from the primary battery pack, the circuit is switched to the secondary battery pack, whereby current is then drawn from the reserve battery pack, in order to maintain adequate threshold power levels to charge devices. This allows the primary battery pack to be removed from the charging station to be recharged or replaced, without disrupting the flow of power to connected devices. It will be understood by one skilled in the art that the charging current may be balanced in one of several ways from or among one or both battery packs, and that the embodiment described is merely one example of such an arrangement.

The present invention also includes a device that is a portable charging station for multiple mobile electronic devices comprising: a rectangular-shaped main housing with a flip lid, the housing comprising a main charging and cell balancing board, a plurality of cord housing compartments each housing a cord extendable up to three feet, the cord comprising a device connector end and a USB connector end, and a faceplate with a plurality of interface ports, which are configured to enable charging of connected electronic devices from a battery pack comprising 20,000 mAh capacity cells for simultaneously charging devices, up to the required $5V_{DC}$ per device.

In another embodiment, the cord housing is an enclosed casing for holding interface retractable charging cords comprising spools of charging cords used for charging mobile devices extendable up to three feet. In another embodiment, the charging cords comprise device ends which can be replaced upon evolving technology requirements for devices. In yet another embodiment the cord spool is a mechanism for retracting cords used for charging mobile devices comprising: a single-sided spool, wherein a mobile device charging cord is extendable up to three feet, and is retractable.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

The invention claimed is:

1. A portable charging station for multiple mobile electronic devices comprising:
    a rectangular shaped housing;
    one or more removable battery packs;
    a main charging board configured as a charge and cell balancing circuit board comprising a plurality of USB ports and connected to the one or more removable battery packs;
    a plurality of interchangeable and removable cord housing cartridges, each cartridge comprising a retractable charging cord, each charging cords having a USB connector end for connecting to the charge and cell balancing circuit board and a device connector end for connecting to a mobile electronic device;
    a faceplate disposed along an upper face of the rectangular-shaped housing configured with one or more USB ports for receiving an ancillary USB-enabled charging cord of a portable electronic device, and a plurality of openings from which device connector ends of cord housing cartridges protrude, thereby enabling simultaneous connection of multiple electronic devices and electronic device charging cords to the charging station.

2. The portable charging station of claim 1, wherein the battery packs are configured for connectivity to the charging board and provide a circuit through the charging cords to a device connected thereto.

3. The portable charging station of claim 1, wherein the battery packs comprise a 20,000 mA capacity.

4. The portable charging station of claim 1, wherein the battery packs are rechargeable.

5. The portable charging station of claim 1, wherein the plurality of charging cables are configured to enable charging of connected electronic devices from the charging station simultaneously at up to 5 $V_{DC}$ per device.

6. The portable charging station of claim 1, wherein the cord housing cartridges comprise an enclosed casing configured with a cord spool mechanism for retracting cords used for charging mobile devices comprising: a single-sided spool, wherein a mobile device charging cord is extendable up to three feet from the spool and is retractable.

7. The portable charging station, further comprising at least one advertising message placed as a wrap and/or silk screening on the exterior of the housing of the charging station.

8. The charging station of claim 1, further configured with one or more waterproof seals.

9. A method of charging a mobile electronic device, comprising connecting the ancillary USB-enabled charging cord of a portable electronic device to the USB port of the portable charging station according to claim 1 and/or the mobile electronic device to a device connector end of a retractable charging cord of the portable charging station according to claim 1.

10. A portable charging station for multiple mobile electronic devices comprising:
    a rectangular shaped housing with a faceplate attached along an upper face;
    a power source comprising a primary battery pack and a secondary battery pack; a charging board configured as a charge and cell balancing circuit board comprising a plurality of USB ports;
    a plurality of interchangeable and removable cord housing cartridges, the cartridges comprising a retractable charging cords, the charging cords each having a charge board connector end for connecting to the charge and cell balancing circuit board and a device connector end for connecting to a mobile electronic device; and
    the faceplate configured with a plurality of openings from which device connector ends protrude, thereby enabling connection of multiple electronic devices to the charging station.

11. The charging station of claim 10, further configured with a control mechanism that causes the power source to select current flow from one of the primary batter pack or the secondary battery pack to the charging board.

12. The charging station of claim 10, the faceplate further comprising one or more USB ports for receiving a USB-enabled cord.

13. The charging station of claim 10, further configured with waterproofing seals.

* * * * *